(12) United States Patent
Garge

(10) Patent No.: US 10,832,264 B1
(45) Date of Patent: Nov. 10, 2020

(54) SYSTEM, METHOD, AND COMPUTER PROGRAM PRODUCT FOR CALCULATING AN ACCEPTED VALUE FOR A PROMOTION

(71) Applicant: GROUPON, INC., Chicago, IL (US)

(72) Inventor: Nikhil Ranjan Garge, Aurangabad (IN)

(73) Assignee: GROUPON, INC., Chicago, IL (US)

( * ) Notice: Subject to any disclaimer, the term of this patent is extended or adjusted under 35 U.S.C. 154(b) by 1663 days.

(21) Appl. No.: 14/193,646

(22) Filed: Feb. 28, 2014

(51) Int. Cl.
G09G 5/00 (2006.01)
G06Q 30/02 (2012.01)

(52) U.S. Cl.
CPC .................. *G06Q 30/0202* (2013.01)

(58) Field of Classification Search
CPC ....................................................... G06Q 30/02
USPC .................................................... 707/999.101
See application file for complete search history.

(56) References Cited

U.S. PATENT DOCUMENTS

2010/0145773 A1* 6/2010 Desai .................... G06Q 10/04
705/7.29

OTHER PUBLICATIONS

MobForest: Model based Random Forest analysis, Software package released for 'R' programming language (Jan. 29, 2013) [online] [retrieved Jul. 2, 2014]. Retrieved from the Internet: <URL: http://cran.r-project.org/web/package.es/mobForest/index.html>. 1 page.

Garge, N. R. et al., *Random Forest Methodology for Model-based Recursive Partitioning: the mobForest package for R*, BMC Bioinformatics 14:125 (Apr. 11, 2013) 8 pages.

Zeileis, A. et al., *Model-Based Recursive Partitioning*, Journal of Computational and Graphical Statistics, 17(2) (2008) 19 pages.

Zeileis, A. et al., *Generalized M-Fluctuation Tests for Parameter Instability*, SFB Adaptive Information Systems and Modelling in Economics and Management Science (Jun. 2003) 19 pages.

\* cited by examiner

*Primary Examiner* — Abhishek Vyas
*Assistant Examiner* — Darnell A Pouncil
(74) *Attorney, Agent, or Firm* — Alston & Bird LLP

(57) ABSTRACT

Provided herein are method, apparatus, and computer program products for facilitating the determination of an ideal discount rate or an ideal accepted value for a promotion based on a plurality of model-based decision trees. The decision trees may be generated based on a set of original data, which may include information from a set of past promotions. The trees may branch into smaller, more homogenous subgroups of the original data until a model is generated for each resulting node of the tree. The plurality of trees may be applied to a current promotion with a set of possible predetermined discount rates in order to determine an ideal discount rate or an ideal accepted value for the promotion.

36 Claims, 11 Drawing Sheets

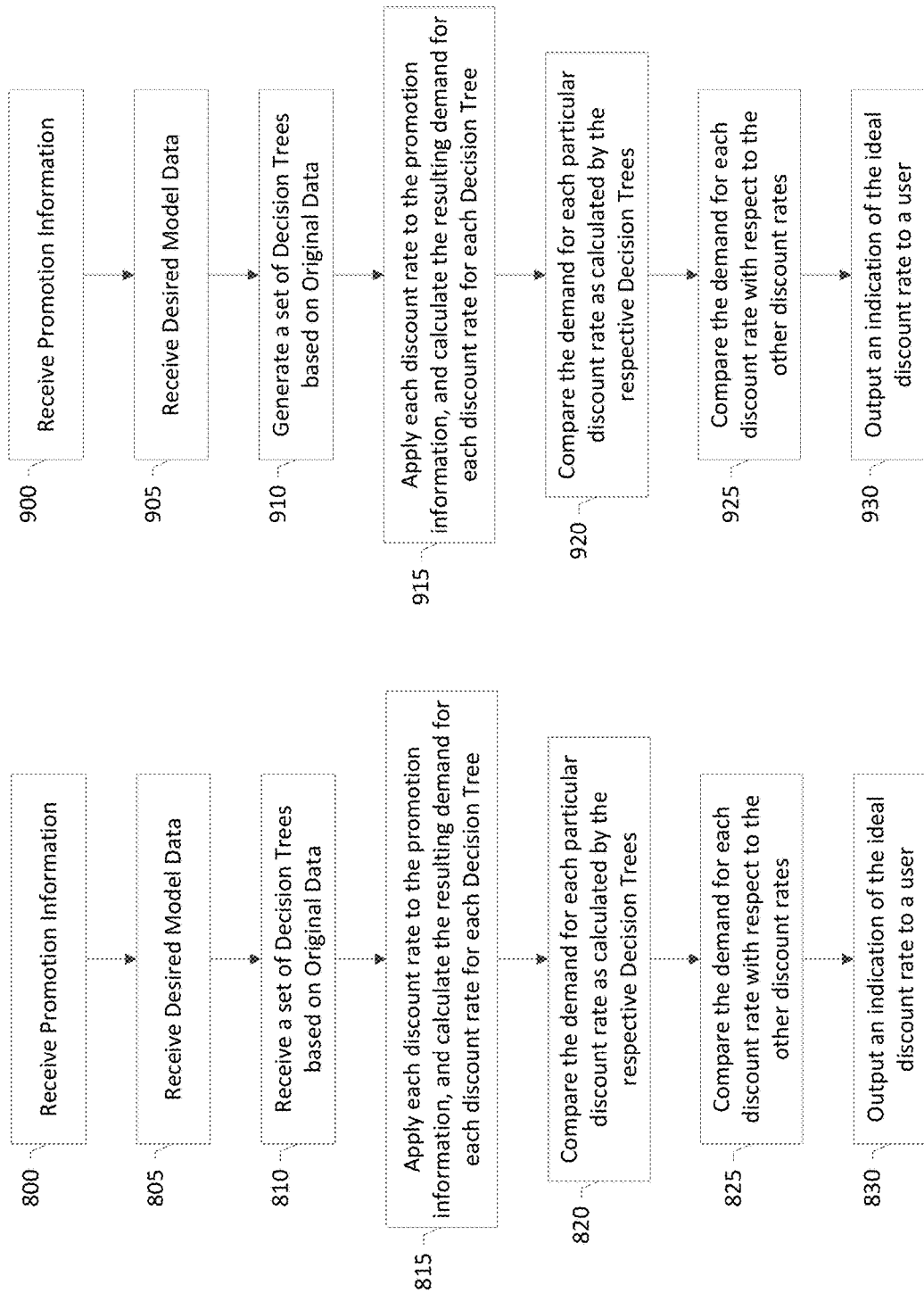

SYSTEM, METHOD, AND COMPUTER PROGRAM PRODUCT FOR CALCULATING AN ACCEPTED VALUE FOR A PROMOTION

TECHNICAL FIELD OF THE INVENTION

The present invention relates to determining an accepted value for a provider or promotion and marketing service.

BACKGROUND

Applicant has discovered problems with current methods of pricing and discounting promotions. In some examples, the pricing of a promotion may be discounted to generate sales and promote the goods or services being sold. However, some current methods for determining an ideal discount rate of a product may be improved. Through applied effort, ingenuity, and innovation, Applicant has solved many of these identified problems by developing a solution that is embodied by the present invention, which is described in detail below.

BRIEF SUMMARY

In general, embodiments of the present invention provided herein include systems, methods and computer program products for the facilitation of determining an accepted value of a promotion.

In some example embodiments, a method is provided for determining an ideal discount rate for a promotion including receiving, via an interface, promotion information about a promotion, wherein the promotion information may include a plurality of promotion variables including at least a promotional value. The method may include calculating, via a processor, for each of a plurality of model-based decision trees, a demand value for the promotion for each of at least one predetermined discount rate by applying the promotion variables with each predetermined discount rate to each decision tree. Some embodiments of the method include aggregating the demand values for each discount rate for each decision tree for the promotion variables to produce an aggregated price elasticity of demand and presenting a discount recommendation to a user based on the aggregated price elasticity of demand.

In some example embodiments, the plurality of decision trees are generated from an original data set including a plurality of deal data, the deal data including a demand data, a price data, and data corresponding to a plurality of predictor variables. In some embodiments, each decision tree may include a plurality of decision points connected by a plurality of branches and ending at a plurality of leaves. In some embodiments, the decision points are conditional filters that indicate one of the plurality of possible branches based on a value of at least one predictor variable. In some embodiments, each decision tree may be generated using a subset of the original data set, wherein each leaf may be a linear model made by performing a linear regression of demand data compared to price data of a remaining subset of data corresponding to a terminal branch.

In some further example embodiments, applying the promotion variables with each predetermined discount rate to each tree includes determining, via a plurality of decision points, a resultant leaf for the promotion variables at each discount rate and may include calculating the demand value for the promotion for each predetermined discount rate with the linear model of the respective resultant leaf. In some embodiments the original data set may be divided into a training set and a test set, wherein the training set may be used to generate one of the plurality decision trees and the test set may be used to evaluate an overall model of the one of the plurality of decision trees.

In some embodiments, the overall model may be evaluated using $R^2$ metric for a predicted demand value of each deal data in the test set. In some embodiments, the original data may be received from previous promotions. In some example embodiments, the subset of the original data set may be generated randomly for each decision tree. In some example embodiments, the subset of the original data set may be generated using random sampling with replacement. In some embodiments, the subset of the original data set may be generated using random sampling without replacement. In some example embodiments, each decision point may be generated by dividing a first remaining subset of the original data at the predictor variable having a highest parameter instability to form a plurality of second remaining subsets. Some embodiments include generating each decision tree by recursively generating decision points from each remaining subset until a stopping point is reached for each branch. In some embodiments, the stopping point may be reached when the second remaining subsets have less than or equal to a minimum number of deal data.

Some example embodiments generate each decision point by selecting a random subset of a first remaining subset and dividing the first remaining subset of the original data at the predictor variable from the random subset having a highest parameter instability to form a plurality of second remaining subsets. In some embodiments, each decision tree may be generated by recursively generating decision points from each remaining subset until a stopping point is reached for each branch. In some embodiments, the stopping point may be reached when the second remaining subsets have less than or equal to a minimum number of deal data.

In some example embodiments, the discount recommendation may be presented as a graphical representation of the demand for the promotion at each of the at least one predetermined discount rate. In some embodiments, the discount recommendation may be presented as an ideal discount rate. In some embodiments, the at least one predetermined discount rate comprises at least one of 10%, 30%, 50%, and 70% discount rates.

In some further embodiments a method is provided that includes receiving, via an interface, promotion information about a promotion. In some embodiments of the method, the promotion information includes a plurality of promotion variables including at least a promotional value. In some embodiments, the method may include presenting a discount recommendation for the promotion. Some embodiments of the discount recommendation may be based on an aggregated price elasticity of demand for the promotion. In some example embodiments, the aggregated price elasticity of demand may be calculated by aggregating a predicted demand for the promotion at each of a number of predetermined discount rates for each of a plurality of model-based decision trees.

In some further example embodiments, an apparatus may be provided that includes at least a processor and a memory associated with the processor having computer coded instructions therein. In some embodiments the computer instructions may be configured to, when executed by the processor, cause the apparatus to receive, via an interface, promotion information about a promotion. In some example embodiments, the promotion information includes a plurality of promotion variables including at least a promotional value. In some embodiments, the computer instructions may further cause the apparatus to calculate, for each of a plurality of model-based decision trees, a demand value for the promotion for each of at least one predetermined discount rate by applying the promotion variables with each predetermined discount rate to each decision tree. Some embodiments of the apparatus may futher aggregate the demand values for each discount rate for each decision tree for the promotion variables to produce an aggregated price elasticity of demand. In some embodiments, the apparatus may present a discount recommendation to a user based on the aggregated price elasticity of demand.

In some embodiments, the plurality of decision trees are generated from an original data set including a plurality of deal data. In some embodiments, the deal data may include a demand data, a price data, and data corresponding to a plurality of predictor variables. In some embodiments, each decision tree may include a plurality of decision points connected by a plurality of branches and ending at a plurality of leaves. In some embodiments, the decision points may be conditional filters that indicate one of the plurality of possible branches based on a value of at least one predictor variable. In some embodiments, each decision tree may be generated using a subset of the original data set, wherein each leaf may be a linear model made by performing a linear regression of demand data compared to price data of a remaining subset of data corresponding to a terminal branch.

Some embodiments of the apparatus may apply the promotion variables with each predetermined discount rate to each tree by determining, via a plurality of decision points, a resultant leaf for the promotion variables at each discount rate and calculating the demand value for the promotion for each predetermined discount rate with the linear model of the respective resultant leaf. In some embodiments, the original data set may be divided into a training set and a test set, wherein the training set may be used to generate one of the plurality decision trees and the test set may be used to evaluate an overall model of the one of the plurality of decision trees.

In some embodiments, the overall model may be evaluated using $R^2$ metric for a predicted demand value of each deal data in the test set. In some embodiments, the original data may be received from previous promotions. In some embodiments, the subset of the original data set may be generated randomly for each decision tree. In some example embodiments, the subset of the original data set may be generated using random sampling with replacement. In some alternative embodiments, the subset of the original data set may be generated using random sampling without replacement.

Some embodiments of the apparatus generate each decision point by dividing a first remaining subset of the original data at the predictor variable having a highest parameter instability to form a plurality of second remaining subsets. In some embodiments, each decision tree may be generated by recursively generating decision points from each remaining subset until a stopping point is reached for each branch. In some embodiments, the stopping point may be reached when the second remaining subsets have less than or equal to a minimum number of deal data.

Some embodiments of the apparatus may generate each decision point by selecting a random subset of a first remaining subset and dividing the first remaining subset of the original data at the predictor variable from the random subset having a highest parameter instability to form a plurality of second remaining subsets. In some embodiments, each decision tree may be generated by recursively generating decision points from each remaining subset until a stopping point is reached for each branch. In some embodiments, the stopping point may be reached when the second remaining subsets have less than or equal to a minimum number of deal data.

In some embodiments, the discount recommendation may be presented as a graphical representation of the demand for the promotion at each of the at least one predetermined discount rate. In some embodiments, the discount recommendation may be presented as an ideal discount rate. In some embodiments, the at least one predetermined discount rate comprises at least one of 10%, 30%, 50%, and 70% discount rates.

In yet some further example embodiments, an apparatus is provided including at least a processor, and a memory associated with the processor having computer coded instructions therein. In some embodiments, the computer instructions are configured to, when executed by the processor, cause the apparatus to receive, via an interface, promotion information about a promotion. In some embodiments, the promotion information includes a plurality of promotion variables including at least a promotional value. In some embodiments, the apparatus may present a discount recommendation for the promotion. In some embodiments, the discount recommendation may be based on an aggregated price elasticity of demand for the promotion. In some embodiments, the aggregated price elasticity of demand may be calculated by aggregating a predicted demand for the promotion at each of a number of predetermined discount rates for each of a plurality of model-based decision trees.

In yet some further example embodiments, a computer program product is provided comprising a non-transitory computer readable medium having computer program instructions stored therein. Some embodiments of the instructions when executed by a processor may receive, via an interface, promotion information about a promotion. In some embodiments, the promotion information includes a plurality of promotion variables including at least a promotional value. Some embodiments of the computer program product may calculate, for each of a plurality of model-based decision trees, a demand value for the promotion for each of at least one predetermined discount rate by applying the promotion variables with each predetermined discount rate to each decision tree. Some embodiments of the computer program product may aggregate the demand values for each discount rate for each decision tree for the promotion variables to produce an aggregated price elasticity of demand. Some embodiments may present a discount recommendation to a user based on the aggregated price elasticity of demand.

In some embodiments, the plurality of decision trees may be generated from an original data set including a plurality of deal data. In some embodiments, the deal data may include a demand data, a price data, and data corresponding to a plurality of predictor variables. In some embodiments, each decision tree may include a plurality of decision points connected by a plurality of branches and ending at a plurality of leaves. In some embodiments, the decision points may be conditional filters that indicate one of the plurality of possible branches based on a value of at least one predictor variable. In some embodiments, each decision tree may be generated using a subset of the original data set. In some embodiments, each leaf may be a linear model made by performing a linear regression of demand data compared to price data of remaining subset of data corresponding to a terminal branch.

In some embodiments of the computer program product, applying the promotion variables with each predetermined discount rate to each tree may include determining, via a plurality of decision points, a resultant leaf for the promotion variables at each discount rate and may include calculating the demand value for the promotion for each predetermined discount rate with the linear model of the respective resultant leaf.

In some embodiments, the original data set may be divided into a training set and a test set, wherein the training set may be used to generate one of the plurality decision trees and the test set may be used to evaluate an overall model of the one of the plurality of decision trees. In some embodiments, the overall model may be evaluated using $R^2$ metric for a predicted demand value of each deal data in the test set. In some embodiments, the original data may be received from previous promotions. In some embodiments, the subset of the original data set may be generated randomly for each decision tree. In some embodiments, the subset of the original data set may be generated using random sampling with replacement. In some alternative embodiments, the subset of the original data set may be generated using random sampling without replacement.

In some embodiments, each decision point may be generated by dividing a first remaining subset of the original data at the predictor variable having a highest parameter instability to form a plurality of second remaining subsets. Some embodiments of the computer program product generate each decision tree by recursively generating decision points from each remaining subset until a stopping point is reached for each branch. In some embodiments, the stopping point may be reached when the second remaining subsets have less than or equal to a minimum number of deal data.

In some embodiments, each decision point may be generated by selecting a random subset of a first remaining subset and dividing the first remaining subset of the original data at the predictor variable from the random subset having a highest parameter instability to form a plurality of second remaining subsets. In some embodiments, each decision tree may be generated by recursively generating decision points from each remaining subset until a stopping point may be reached for each branch. In some embodiments, the stopping point may be reached when the second remaining subsets have less than or equal to a minimum number of deal data.

In some embodiments, the discount recommendation may be presented as a graphical representation of the demand for the promotion at each of the at least one predetermined discount rate. In some embodiments, the discount recommendation may be presented as an ideal discount rate. In some embodiments, the at least one predetermined discount rate comprises at least one of 10%, 30%, 50%, and 70% discount rates.

In yet some further embodiments, a computer program product is provided that includes a non-transitory computer readable medium having computer program instructions stored therein. Some embodiments of the instructions, when executed by a processor, input, via an interface, promotion information about a promotion. In some embodiments, the promotion information includes a plurality of promotion variables including at least a promotional value. Some embodiments of the computer program product receive a discount recommendation for the promotion. In some embodiments, the discount recommendation may be based on an aggregated price elasticity of demand for the promotion. In some embodiments, the aggregated price elasticity of demand may be calculated by aggregating a predicted demand for the promotion at each of a number of predetermined discount rates for each of a plurality of model-based decision trees.

BRIEF DESCRIPTION OF THE DRAWINGS OF THE PRESENT INVENTION

Having thus described embodiments of the invention in general terms, reference will now be made to the accompanying drawings, which are not necessarily drawn to scale, and wherein:

FIG. 8 is a flowchart illustrating a system that is configured to determine an ideal discount rate for a promotion, in accordance with an example embodiment of the present invention;

FIG. 9 is a flowchart illustrating a system that is configured to determine an ideal discount rate for a promotion, in accordance with an example embodiment of the present invention;

DETAILED DESCRIPTION

Figure 1:
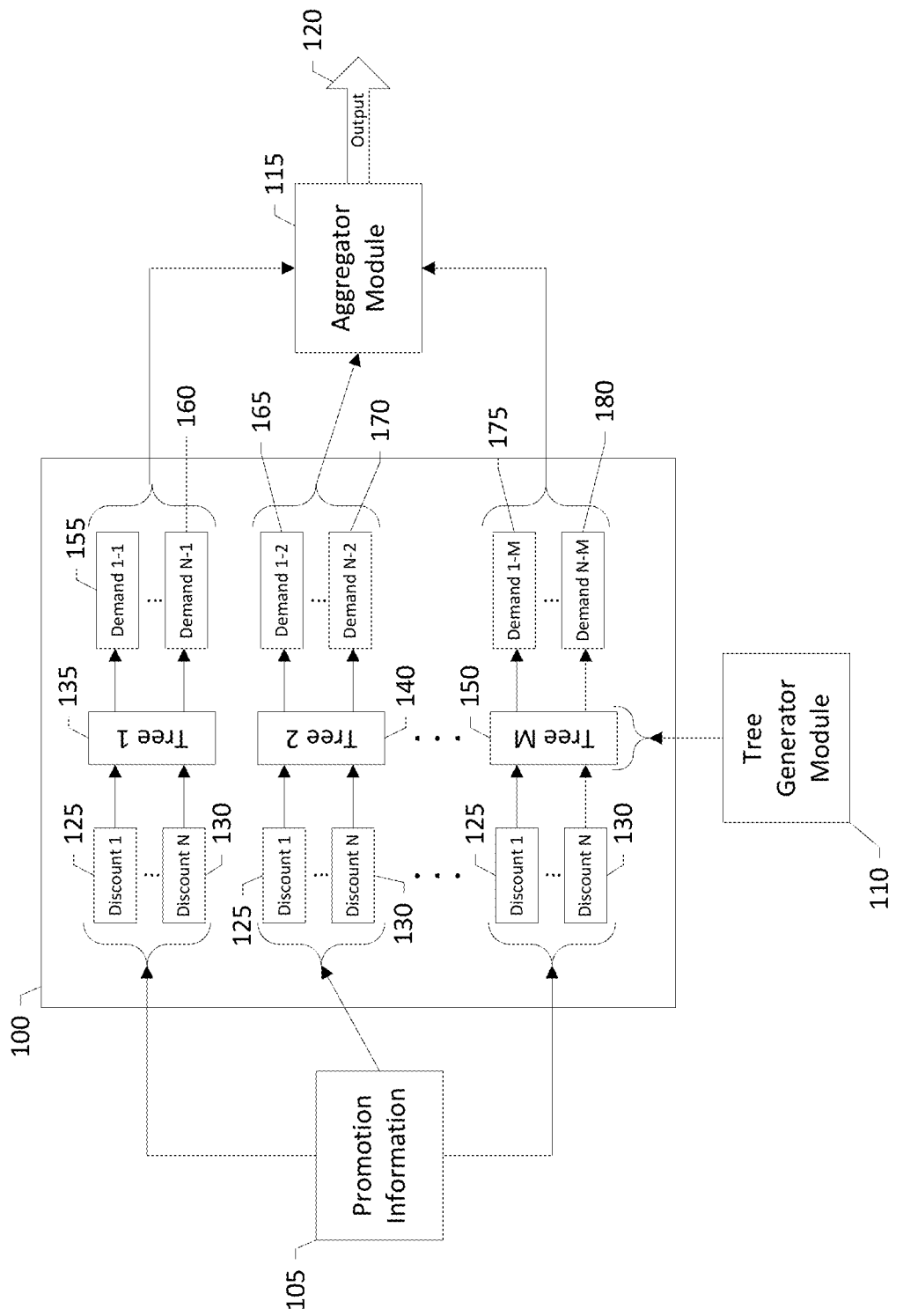
FIG. 1 is a block diagram of a system that is configured to determine an ideal discount rate of a promotion, in accordance with an embodiment of the present invention.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

Terminology

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and is operable to provide example promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like.

As used herein, the term "provider" may include, but is not limited to, a merchant, business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire for use by a person who runs or participates in athletic activities.

As used herein, the term "consumer" may include, but is not limited to, a client, customer, purchaser, shopper, user, or the like, who may be in the position to or does exchange value for one or more vouchers under the terms defined by one or promotions. For example, and using the aforementioned running company as the example provider, a consumer may be an individual who is interested in purchasing running shoes.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. An example promotion, using the aforementioned running company as the example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. Using the running company promotion as an example, the accepted value is $25 and the promotional value is $50. Promotional value may also be referred to as the original price of the promotion. In this example, the residual value may be equal to the accepted value.

As used herein, the terms "discount" or "discount rate" may define the percentage difference between the accepted value and the promotional value of the promotion, such that the discount is the amount price of the promotion is reduced from its original, promotional value when sold at the accepted value.

Brief Overview

Methods, apparatus, and computer program products described herein are operable for facilitating the determination of an accepted value of one or more promotions offered by a promotion and marketing system. In some embodiments, the discount of a promotion may be calculated based on a predicted price elasticity of demand of the promotion. An ideal discount or ideal discount rate is a discount rate that produces an ideal accepted value of the promotion. Embodiments of the present invention may determine either or both of an ideal discount rate and an ideal accepted value of a promotion. In some embodiments, the ideal discount may be one that maximizes revenue or maximizes profits. In some embodiments, the ideal discount may be selected to hit a predetermined sales target for the promotion. The ideal discount may be determined by the specific user, whether a promotion and marketing service or a provider, and may be tuned to the specific user's needs.

All types of products, experiences, goods and services may be sold as promotions by a promotion and marketing service. The promotion and marketing service sells promotions at a discount rate that may be determined, in some embodiments, either directly or indirectly by the price elasticity of demand of the promotion. Using the price elasticity of demand, an ideal discount rate and an ideal accepted value of the promotion may be calculated.

Price elasticity of demand is defined as the rate at which demand changes for a given, incremental change in price. It would be appreciated by one of ordinary skill in the art that numerous different promotions may have varying price elasticity of demands. Some promotions may be highly demanded no matter what the price or discount rate and thus a lower discount rate should be used to determine the ideal accepted value. Alternatively, some promotions may be extremely price sensitive and may need higher discount rates to achieve the ideal accepted value because the user is particularly sensitive to the price of the promotion.

In order to calculate the price elasticity of demand and, thereby, an ideal discount or ideal accepted value, some embodiments of the present invention obtain predicted demands for a promotion based on various prices by applying different discount rates to a model of the promotion. In some embodiments, the predicted demands are determined by applying different accepted values to a model of the promotion. Some embodiments of the present invention may consider the relationship between possible discount rates and the predicted demands, or some embodiments may consider the relationship between possible accepted values and the predicted demands. The demand for the promotion at different discount rates and/or accepted values may be used to determine an ideal accepted value and thereby an associated ideal discount rate for the promotion.

Some embodiments of the present invention use a model-based ("MOB") recursive partitioning technique to generate a model of the demand for the promotion based on a set of original data, in order to predict the demand for a given promotion at a number of predetermined discount rates. The model-based recursive partitioning technique may develop multiple models for a plurality of subsets of the original data. In some embodiments, the original data may be selected from a homogeneous group of promotions, for example—food or drink promotions in Italy, in order to ensure the accuracy of the overall model. In some further embodiments, the group of promotions that make up the original data may be chosen based on the type of promotion being presently analyzed. In some alternative embodiments, a global set of promotions are used for all models.

In some embodiments, the original data is comprised of historical data from a plurality of past promotions. The original data may include predictor variables about each past promotion such as a number of promotions sold (e.g. demand), promotional value, and a discount rate and/or accepted value. Other examples of predictor variables include, but are not limited to, city size, weather, seasonality, commission earned by the promotion and marketing service, importance of the promotion, lead quality, type of promotion, an indication of a new or existing provider, and any other feature or property that may serve to distinguish one promotion from another.

Some embodiments of the present invention develop one or more MOB trees based on a subset of the original data. A MOB tree or decision tree is generated by creating a plurality of decision points that group the subset of original data into smaller and smaller clusters based on the similarity of the data's respective predictor variables. Each decision point receives a "branch" or cluster of data as an input, and splits the branch across a value of one or more predictor variables. The decision point then creates two branches, one on either side of the value of the predictor variable used to split the data. This process continues recursively until each branch reaches a stopping point. As explained in further detail below, some embodiments may improve the fit of the model by setting stringent p-values for the decision points. As will be discussed in greater detail below, the stopping points may be any of a number of deciding factors that stop another decision point from being formed on the particular branch. For each branch that reaches an ending point, a separate model or "leaf" may be generated from the remaining data in each branch. In some embodiments the leaf model may be a linear regression model. Each linear regression model may be based on a subset of the data that is more closely related so that the linear model more accurately conforms to the demand of the product over that set of data. By generating a separate model for more homogeneous subsets of the overall data (e.g. the individual branches), the fit of the overall model may be improved. Likewise, a plurality of trees may be generated for the original data and averaged to increase the accuracy of the model.

In some embodiments, a second subset of the original data is used to determine the accuracy of each MOB tree. In some embodiments, the original data is split into a training set and a test set by randomly sampling from the original data either with or without replacement. In some further embodiments, new training and test sets are generated from the original data for each MOB tree. The training set may be used to generate the branches and decision points, and the test set may determine the accuracy of the model via $R^2$ value or a similar accuracy estimate.

Some embodiments generate decision points by splitting the data across a predictor variable or variables having the greatest parameter instability. Splitting across the greatest parameter instability allows the decision point to divide the data into the most homogenous groups. In some embodiments, a random subset of the predictor variables are considered at each decision point for the variable with the highest instability so that, across the plurality of MOB trees, the effect of more divisive variables doesn't drown out the weaker predictors.

In some embodiments of the present invention, a promotion is applied via "what-if" analysis to the one or more MOB trees with one or more discount rates to generate a predicted demand for the promotion at each discount rate. Using the combined results for the demand calculated at each discount rate by each decision tree, the system may accurately determine an ideal discount rate that gives an ideal accepted value of the promotion (e.g. maximizes revenue).

In some embodiments, the system may be embodied as a tool and may be designed specifically with a particular user in mind. For example, in some embodiments, the present invention is used by or otherwise accessible via a promotion and marketing service. The system may be used by the promotion and marketing service to determine an ideal discount at which to sell a provider's promotion. In this embodiment, the system may be configured to give more detailed information about the price elasticity of demand for the promotion.

In some alternative embodiments, a provider interface may be used. The provider interface may be configured to receive promotion information from a provider, calculate the demand information remotely or receive premade models to calculate the demand values with, and then output the information to the provider.

The system may output an indication of a preferred or ideal discount rate based on the predicted demand information. The output may be text-based and/or graphical and may display as much or as little information as the provider or promotion and marketing service desires.

Exemplary System Architecture

Reference will now be made to several exemplary architectures of the present invention. FIG. 1 is a block diagram showing a system that is configured to determine an accepted value of a promotion. In some embodiments, a demand module 100 may receive M trees 135, 140, 150 from a tree generator module 110. The demand module 100 may also receive promotion information 105 via a user or memory device (not pictured). The promotion information 105 may contain several promotion variables that, in some embodiments, include a promotional value of the promotion. In some embodiments, the promotion information 105 may include one or more possible discount rates, or, alternatively, possible discount rates may be stored in the demand module. In some embodiments, a user may be presented with an option to choose specific discount rates. Additionally or alternatively, if no discount rates are selected, the system may use a default set of discount rates. In some embodiments, the discount rates may be determined from the existing discount rates in the set of original data.

The demand module 100 may receive the promotion information 105 and apply the promotion information to N discount rates 125, 130. Each of the N discount rates combined with the promotion information may be applied to each of M decision trees 135, 140, 150. Each decision tree 135, 140, 150 in the demand module 100 generates a predicted demand 155, 160, 165, 170, 175, 180 for each discount rate 125, 130 as applied to the promotion information 105.

In some embodiments, the demand module 100 then transfers the predicted demands 155, 160, 165, 170, 175, 180 to an aggregator module 115. The aggregator module may combine the demand data 155, 160, 165, 170, 175, 180 to determine, either directly or indirectly, a price elasticity of demand and provide an output 120 to the user. As discussed in greater detail herein, the output 120 may take any form including but not limited to a graphical representation of an accepted value or discount rate versus demand curve for different prices, a text indication of the demands for each discount rate or accepted value, or it may be a numerical representation of an ideal accepted value or an ideal discount rate for the promotion. The output 120 may be an exact number, a range of values, or a predicted value with a computed confidence interval.

Figure 2:
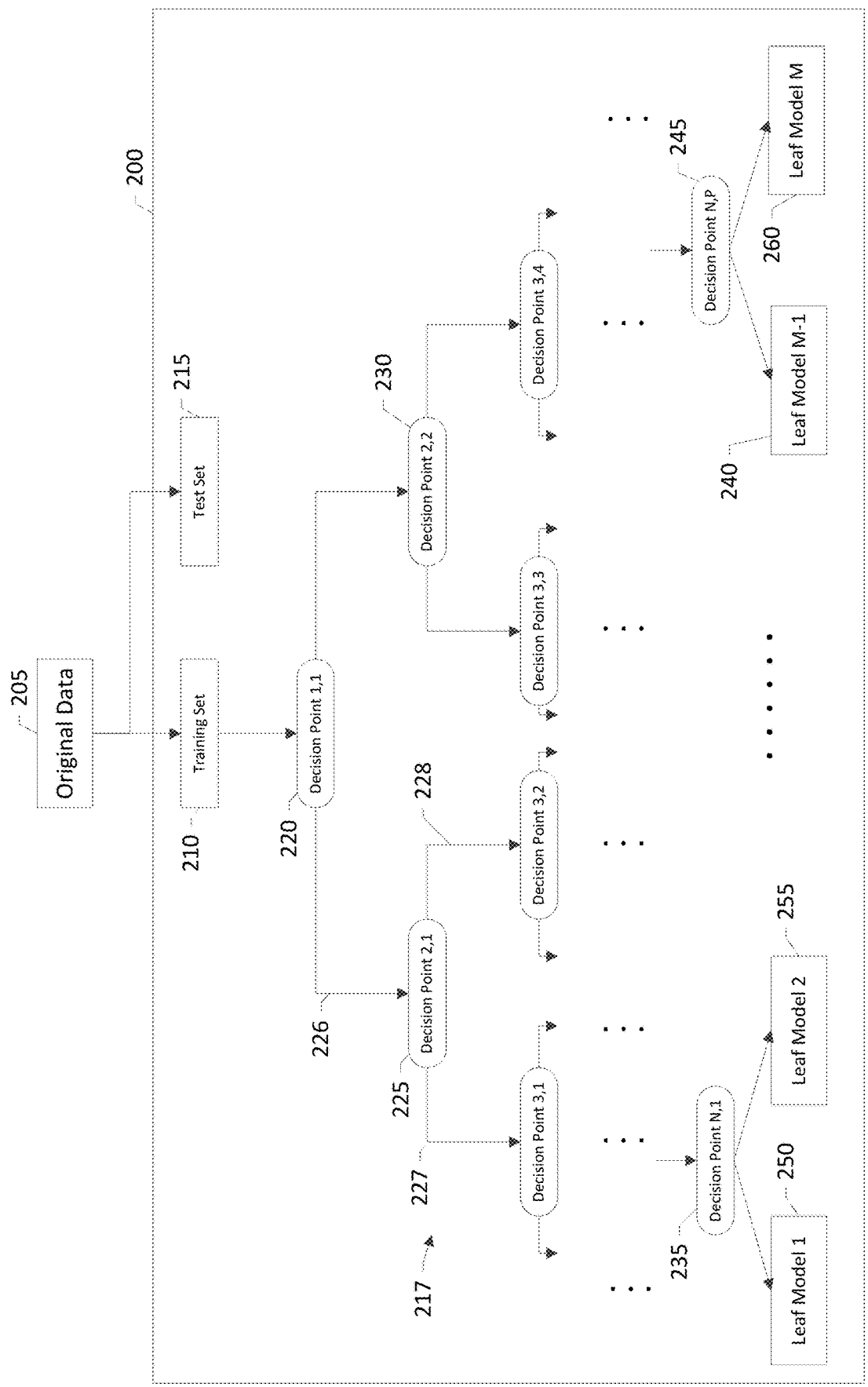
FIG. 2 is a block diagram of a system that is configured to generate a decision tree, in accordance with an embodiment of the present invention.

FIG. 2 is a block diagram of the tree generation module 200. In some embodiments, the tree generation module is configured to generate one or more MOB trees based on a set of original data 205. As will be explained in greater detail herein, the tree module 200 may generate the one or more MOB trees simultaneously or sequentially. The tree generation module splits the original data into a training set 210 and a test set 215. The training set may be created by bootstrapping (e.g. sampling with replacement) from the original data 205 set or by sub-sampling (e.g. sampling without replacement) from the original data. As discussed in further detail below, in some embodiments, the training set may be the same for every tree (each tree sampled from the same set) or may be generated anew for each tree. Beginning with the training set 210, the tree generation module 200 may create a plurality of decision points 217, each decision point 220, 225, 230, 235, 245 is created by splitting the branch or data cluster connecting the decision point to the decision point above it. In some instances, the branch or data cluster may be the training set, as in the case of the first decision point 220, or the branches may be a residual received dataset from the preceding decision point. For example, in the embodiment shown in FIG. 2, the decision point 2,1 225 receives the branch 226 from the decision point above it 220. In this embodiment, the decision point 225 then splits into two branches 227, 228, each containing a portion of the branch 226 that entered the decision point 225.

In some embodiments, the decision points 217 split across a predictor variable or variables that indicate high parameter instability. As explained in greater detail below, parameter instability of the predictors may be computed using a class of generalized M-fluctuation tests. In some embodiments, the sup LM statistic may be used for numerical predictor variables. In some embodiments, a $\chi^2$ or chi-squared statistic that captures the fluctuation within each of the categories of predictor may be used for categorical partitioning variables. By splitting the data at the highest parameter instability, each decision point may create two increasingly homogenous subsets of data that are then fed into respective new decision points.

Figure 6:
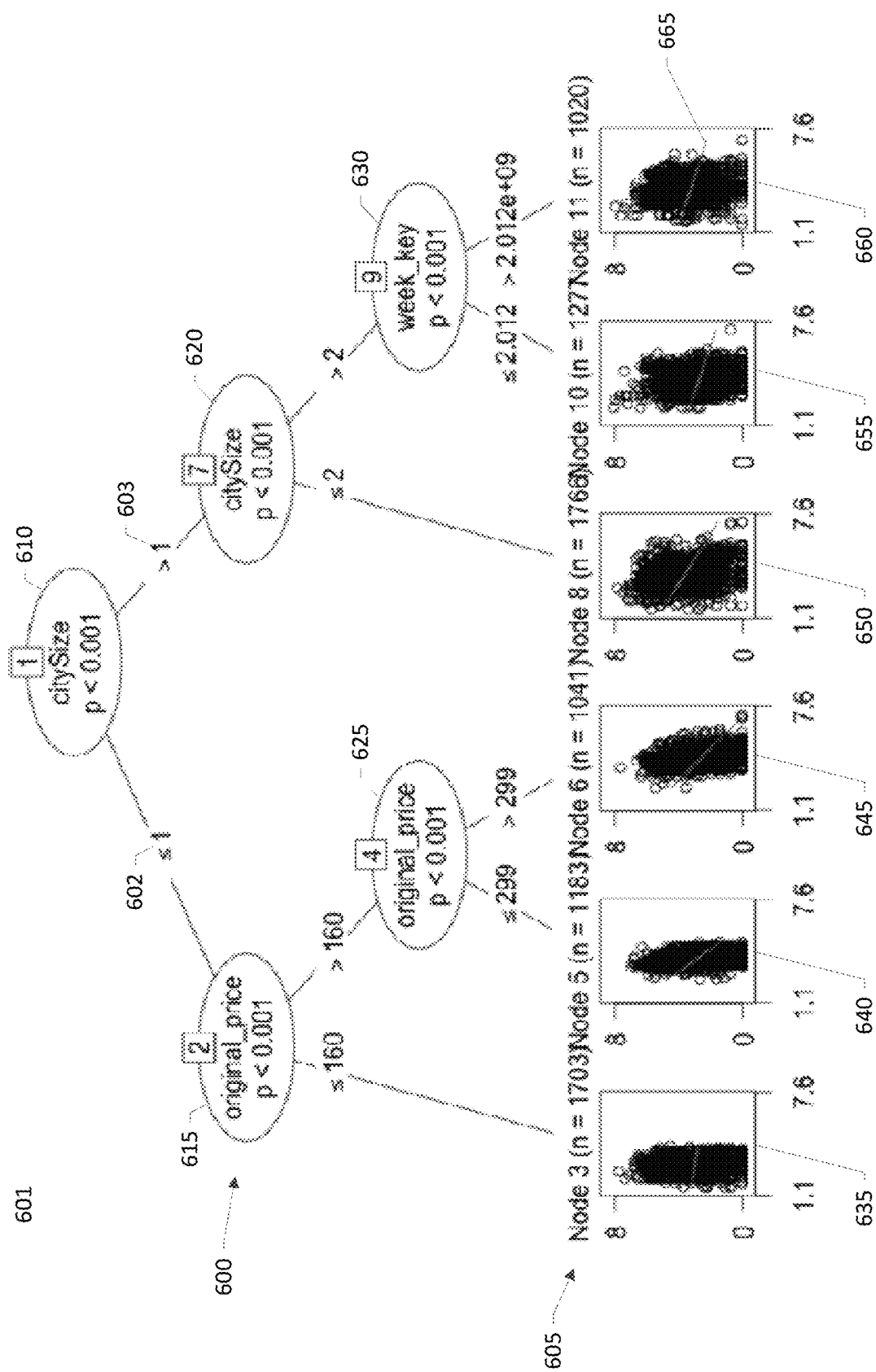
FIG. 6 is an example of a decision tree, in accordance with an embodiment of the present invention.

In some embodiments, the decision points 217 recursively split to create smaller and smaller branches of data until a stopping point is reached. As described in greater detail herein, the tree generator module may determine for each branch individually when a stopping point has been reached based on a set of criteria. FIG. 2 shows a final, Nth row of decision points having a first 235 through Pth 245 decision point as the final set of decision points. However, one of ordinary skill in the art will appreciate that some embodiments of the tree models may not end with all of the leaves on the same tier. Indeed, the decision point may end a branch of the tree when a predetermined criterion is reached, regardless of whether the remaining branches have reached a stopping point. For example, FIG. 6 shows a MOB tree having stopping points at different levels of the tree. When a given branch of the tree reaches a stopping point, a leaf model 240, 250, 255, 260 is generated. While the embodiment shown in FIG. 2 has four or more leaves 240, 250, 255, 260, one of ordinary skill in the art will appreciate that each tree may have any number of leaves based on the stopping point criteria and the set of data being modeled.

In some embodiments, each leaf model 240, 250, 255, 260 is created using a statistical model of the resulting data set in the given branch. In one embodiment, as shown in FIG. 6, the leaves 635, 640, 645, 650, 655, 660 may be generated with a linear regression 665. As will be explained in further detail below, some embodiments may use more complicated regression models, and it would be appreciated by one of ordinary skill in the art that a leaf model can use any type of model of the data that can be fit to the data.

Figure 3:
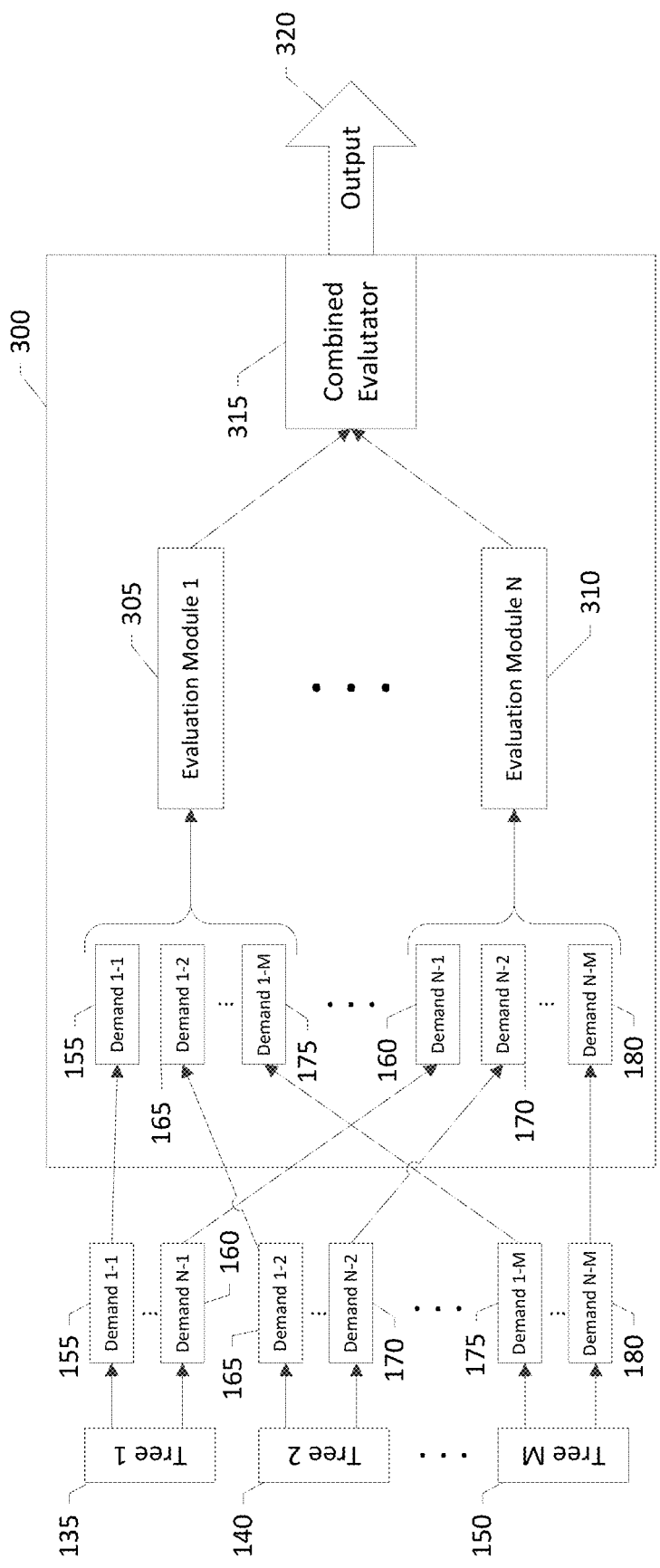
FIG. 3 is a block diagram of an aggregation and evaluation system, in accordance with an embodiment of the present invention.

FIG. 3 shows a block diagram of an aggregator module 300 in accordance with one embodiment of the present invention. In some embodiments, the aggregator model 300 may receive predicted demand data 155, 160, 165, 170, 175, 180 from the plurality of tree models. In some embodiments, the predicted demand data 155, 160, 165, 170, 175, 180 may be the predicted demand for the promotion at one or more discount rates (shown in FIG. 1) as computed by each of the M tree models 135, 140, 150. Once the demand data 155, 160, 165, 170, 175, 180 is received by the aggregator module, the aggregator module combines the data to determine the ideal discount and present an output 320 to the user.

In some embodiments of the present invention the aggregator module first collects every demand point for a given discount rate and compares them and combines them into an average or aggregated demand for that single discount rate. For example, in the embodiment shown in FIG. 3, Evaluation Module 1, 305, receives the demands for discount rate 1 for each of the M trees 155, 165, 175 and combines them and evaluates them to determine an aggregate demand for the first discount rate. Likewise, in some embodiments, Evaluation Module N 310 combines the demand outputs for the Nth discount rate 160, 170, 180 and combines them to form an aggregate demand for the Nth discount rate.

In some embodiments once each discount rate is independently evaluated in Evaluation Modules 1 through N, a Combined Evaluator module 315 will aggregate and analyze the outputs from the Evaluation Modules 305, 310 to determine an ideal demand and an ideal discount rate to produce the highest revenue. In some embodiments, a predicted demand is determined for each potential discount rate or accepted value across multiple tree models. Some embodiments may then average the predicted demands for each discount rate across the tree models to obtain a stable estimate for the demand at each discount rate. As discussed herein, the output may be in any form including a graphical display of a price elasticity of demand, discount rate, and/or accepted value for the promotion. In some embodiments the output may be a text-based display of the ideal discount rate and/or accepted value to arrive at the ideal accepted value of the promotion.

In some alternative embodiments, demand information from each tree, 1 through M, may be considered first, and then the results may be combined with the demand results from the other trees to arrive at an output of ideal discount.

Tree Generation

Figures 4, 5:
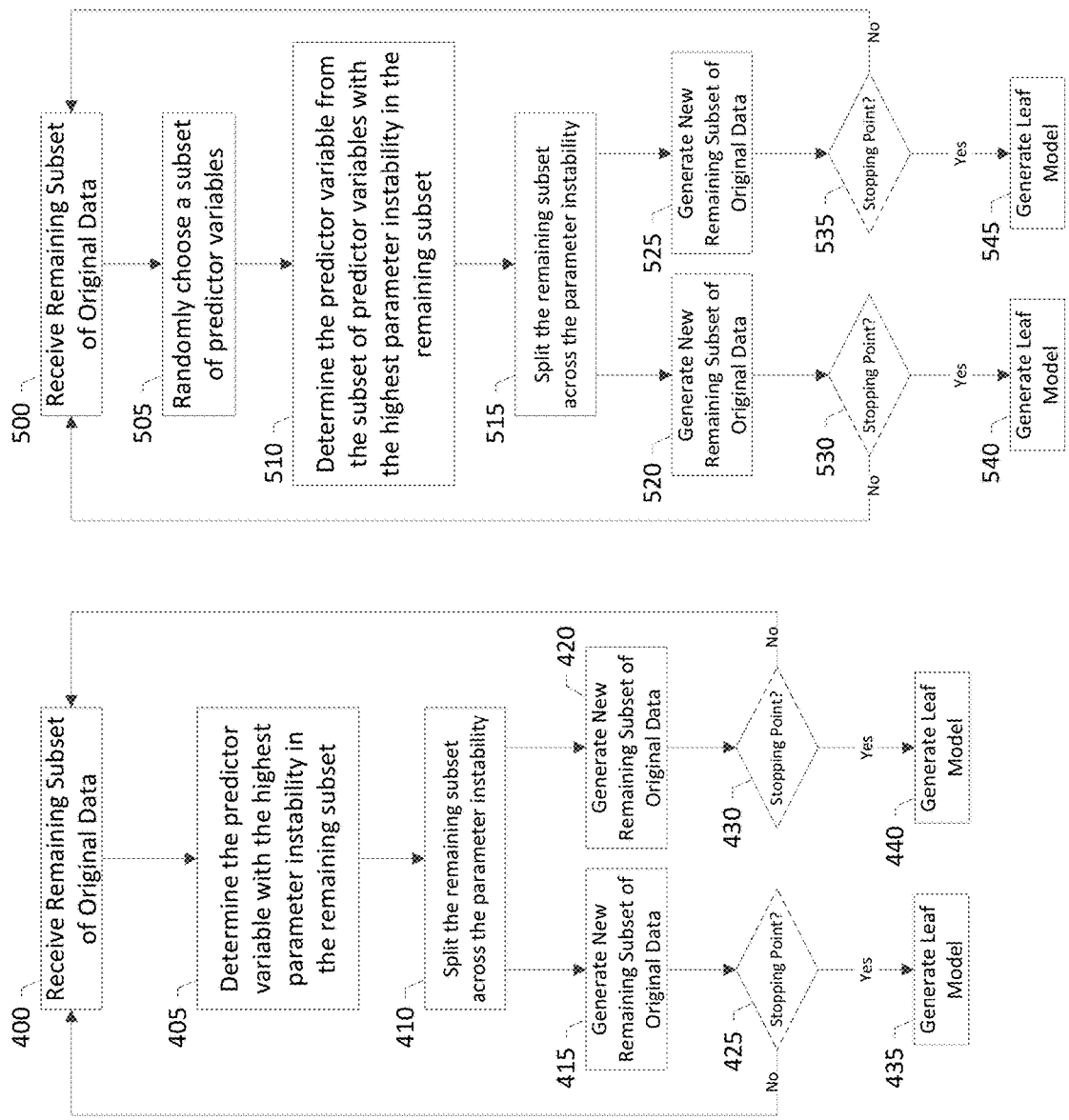
FIG. 4 is a flowchart illustrating a method for recursively generating decision trees, in accordance with an embodiment of the present invention.
FIG. 5 is a flowchart illustrating a method for recursively generating decision trees, in accordance with an embodiment of the present invention.

Reference will now be made to several embodiments of a tree model generation method. The tree models may be generated recursively by splitting the data at each decision point until a given branch of the data has reached a stopping point. With reference to FIG. 4, an embodiment of the recursive algorithm is shown that may generate one or more decision points. First, the algorithm may receive a branch or remaining subset of the original data 400. In the case of the first decision point, shown in FIG. 2 as decision point 1,1 220, the first decision point may receive a full training set of original data and each subsequent decision point receives only the remaining subset of original data passed along to it by the previous decision point. As noted above, the original data may be selected from a homogeneous group of promotions in order to ensure the accuracy of the overall model. In some further embodiments, the group of promotions that make up the original data may be chosen based on the type of promotion being presently analyzed. In some alternative embodiments, a global set of promotions are used for all models.

Next the algorithm may determine the predictor variable with the highest parameter instability in the branch or remaining subset of data 405. This process may allow the decision points to split the data across the most divisive parameter or predictor variable at each decision point. The algorithm may split the remaining subset across the parameter instability 410 and may generate two new branches using the remaining subsets of the data on either side of the parameter instability 425, 430. As noted above, numerous methods may be used to split the predictor variables. For example, in some embodiments, parameter instability of the predictors may be computed using a class of generalized M-fluctuation tests. These tests may check parameter instability in an M-estimation framework and are based on partial sum processes of M-estimation scores for which functional central limit theorems are derived under the null hypothesis of parameter stability. These tests are discussed in Zeileis and Hornik, *Generalized M-Fluctuation Tests for Parameter Instability*, SFB "Adaptive Information Systems and Modelling in Economics and Management Science," June 2003, which is incorporated by reference herein in its entirety. In some embodiments, the supLM statistic may be used for numerical predictor variables. Based on the Lagrange Multiplier test, the supLM statistic determines the supremum of all single split LM statistics to find a split point having the ideal parameter instability. The sequence of single break LM statistics can be computed by taking the squared Euclidean norm of the empirical fluctuation process weighted by its variance. The supLM statistic may be represented by the equation:

$$sup_{t \in \pi} \frac{\|efp(t)\|_2^2}{t(t-1)}$$

In this embodiment epf represents the empirical fluctuation process and $\pi$ represents the interval. In some embodiments, a $\chi^2$ or chi-squared statistic that captures the fluctuation within each of the categories of predictor may be used for categorical partitioning variables. The algorithm may then check if a stopping point has been reached in either of the two new branches 425, 430.

A stopping point may be any set of criteria that determines when a branch has ended including a minimum number of individual data points in a given branch or a minimum amount of variability in a given branch. For example, in some embodiments, if the number of promotions in a branch is below 700, the branch is not split further. In some embodiments, there may be a maximum number of decision points after which the tree stops splitting and forms leaf models. In some embodiments, a branch may not split further if the bonferroni-corrected p-value for the branch is above a certain threshold. For example, in some embodiments the threshold p-value may be 0.0001. In some embodiments, having a more stringent p-value ensures that the tree models are more stable. The stopping point may be any set of criteria, and the generation of the branches may stop all at once or individually as each branch reaches a stopping point. In some embodiments, once a stopping point has been reached, the specific branch generates a leaf model 435, 440, which is a model of the data in each branch.

With reference to FIG. 5, one alternative embodiment of the tree generation algorithm uses a random forest method of generating a MOB tree. As with the embodiment described in FIG. 4, the random forest method receives a remaining subset of the original data 500 from the branch and decision point above it. Using the random forest method, some embodiments of the algorithm choose a random subset of the predictor variables 505 to consider for parameter instability and then may determine the predictor variable from only that random subset of the predictor variables that has the highest parameter instability 510. The branch is still split in its entirety 515 but based only on the subset of predictor variables. This allows the algorithm to introduce more randomness into each tree and allows less divisive and smaller but still important variables to be represented in the tree models. For example, if one variable has a high degree of instability, the standard model would use that variable as a splitting point fairly consistently between tree models. In the embodiments that use the random forest method, the highly unstable variable is sometimes ignored, which allows the decision trees to be more random. This randomness may help increase the fit of the model over a large number of trees.

In some embodiments, the random forest method of FIG. 5 may then split the branch of data across the parameter instability 515 as in FIG. 4 and then generate two new branches 520, 525 using the methods described above. In some embodiments, the model then determines whether or not a stopping point has been reached for the given branch 530, 535, and if yes, generates a leaf model 540, 545, and if no, generates a new decision point.

FIG. 6 shows an example tree generation in accordance with one embodiment of the present invention. The tree model 601 may generate a plurality of decision points 600 around various predictor variables of the original subset of data. For example, in the embodiment shown in FIG. 6, decision point 1 610 splits the data across a "city size" variable, such that city sizes less than or equal to "one" are divided into the left branch 602, and city sizes greater than "one" are divided into the right branch 603.

Each decision point may have a p-value, such as 0.001 in FIG. 6, which represents the level of significance of a given variable (e.g. city size in the first decision point 610) in creating two different subsets of variables (e.g. in the resultant branches) such that the price-demand relationship may differ in the resultant branches. In decision point 2, 615 the branch of "city size" data 602 from the first decision point 610 is then split across an "original price" (e.g. promotional value) parameter 615. The left branch of decision point 2 615 may then reach a stopping point wherein a leaf model or node 635 is created. The right branch of decision point 2, 615, may then create decision point 4, 625, which further filters the "original price" between less than $299.00 and greater than $299.00. Each of the resulting branches may then reach a stopping point and generates nodes 5 and 6, 640, 645.

Likewise, with the other side of the tree in the embodiment shown in FIG. 6, for city sizes greater than one, a $7^{th}$ decision point 620 may be split across city sizes greater than two and less than two, but still greater than one from the original branch 603. The left branch of decision point 7, 620, may then generate leaf model 8, 650, and the greater than 2 branch generates decision point 9, 630, and the algorithm may then generate leaf nodes for each of the resulting branches 655, 660. In some embodiments, the leaf models 605 create linear regressions of the resulting data from each branch, such that each leaf 605 is a model of the branch of data connected to it. For example, node 3, 635, is a model of the subset of original data that has a city size less than or equal to one and an original price less than or equal to $160. An exemplary linear regression 665 is indicated in the graph below each node in FIG. 6. Once fit, the linear regression model is used to calculate the demand of any resulting promotion that fits the criteria of that leaf based on the decision points above it.

In some embodiments, the linear regression model may be calculated by finding the equation of the line $y=\alpha+\beta x$ that fits the data most accurately. In some methods, this may be determined by minimizing the sum of squares for error (SSE), also known as the sum of squares of the residuals (SSRes). SSE is calculated by the total sum of the square of the actual demand value minus the predicted demand value as shown in the equation:

$$SSE = \sum_i (y_i - \hat{y}_i)^2$$

In this embodiment, $y_i$ represents the actual demand for the i-th discount rate, and $\hat{y}_i$ represents the predicted demand for the i-th discount rate using the tree model. The linear fit may then be calculated by substituting the linear model for the predicted demand and minimizing the equation:

$$\min_{\alpha,\beta} \left( \sum_i (y_i - \alpha - \beta x_i)^2 \right)$$

Figure 7:
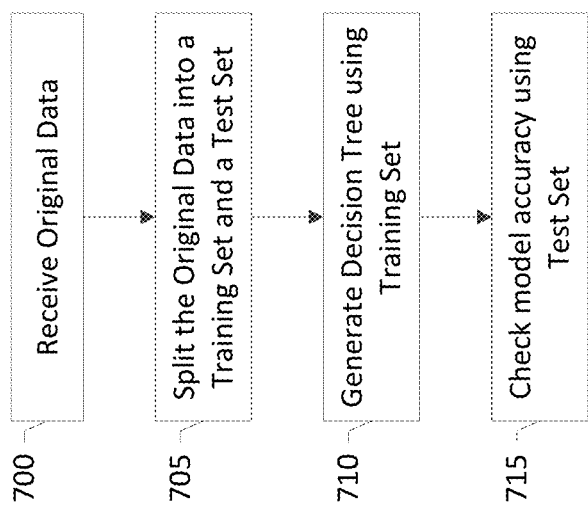
FIG. 7 is a flowchart illustrating a method for generating and evaluating a decision tree, in accordance with an embodiment of the present invention.

FIG. 7 shows a flowchart of one exemplary embodiment of the tree generation module of the present invention. The model receives the original data, splits the original data into a training set and a test set 705, generates a decision tree using the training set 710, and then uses the test set to check the accuracy of the given decision tree 715. The test set evaluates the model's accuracy through a variety of criteria. For example, in some embodiments the model accuracy may be evaluated based on the $R^2$ metric. Since the response variable, demand, may be continuous, the accuracy of the model may be computed using an $R^2$ metric on the predictions obtained using the test set. The test set is applied to the tree generated by the training set as in the methods previously described for predicting the demand of the promotion, and the values of demand created by the tree for the test set are compared with actual known values of demand for the test set to determine the accuracy of the model 715. $R^2$, also known as the coefficient of determination, is defined by the equation $$R^2 = \left( 1 - \frac{SSE}{SSTO} \right),$$

where SSE represents the sum of squares for error or the residual sum of squares, as described above, and SSTO represents the total sum of squares of the data set.

SSTO is represented as the sum of the squares of the actual demand value minus the mean of the actual demand values as shown in the equation:

$$SSTO = \sum_i (y_i - \bar{y}_i)^2$$

In this embodiment, $\bar{y}_i$ represents the mean of actual demand values. The $R^2$ value ranges from 0 to 1 with 0 suggesting poor model performance and 1 suggesting good model performance.

In some alternative embodiments Mean Square Error (MSE) may be used to determine the accuracy of the model. In some embodiments, MSE may be represented by the equation:

$$MSE = \frac{1}{n} \sum_{i=1}^{n} (\hat{y}_i - y_i)^2$$

Where $\hat{y}_i$ represents the predicted demand value of the i-th discount rate and $y_i$ represents the actual demand value of the i-th discount rate out of a total of n predictions.

Demand Calculation

The preceding section described the various embodiments of generating a tree using model-based recursive partitioning. As will now be described in greater detail, the promotion data may be applied to each MOB tree to determine the demand for the promotion at various predetermined discount rates. FIG. 8 shows one embodiment of the present invention wherein the model receives promotion information 800 either from a user or via a memory or network. The model then receives a desired model data 805. The desired model data 805 may include a predetermined discount rate, a preferred number of tree models, or any indication of a preferred modeling technique or method. In some embodiments, the desired model data 805 may be predetermined for the system, or the desired model data may be received with the promotion information for a specific promotion in other embodiments.

The model may then receive a set of decision trees based on the original data 810. As noted above, the original data may be selected from a homogeneous group of promotions in order to ensure the accuracy of the overall model. In some further embodiments, the group of promotions that make up the original data may be chosen based on the type of promotion being presently analyzed. In some alternative embodiments, a global set of promotions are used for all models.

In some embodiments, the tree model generator may not be a part of the system, and the tree models may be received from a memory or network, as discussed below. Some alternative embodiments generate the tree models and apply the promotion data to the models in the same system. Each discount rate may be applied to the promotion information including a promotional value of the promotion and the resulting demand for each discount rate is calculated for each decision tree 815. Within each tree, the promotion information is compared with each decision point, and the comparison follows the branches whose predictor variables correspond to the promotion information. Once a branch corresponding to the promotion information terminates, the leaf/node model at the end of the particular branch may be used to calculate the demand for the promotion. By applying the promotion variables to the equation representing the model, a predicted demand may be determined for the particular tree. In some embodiments, the demand for each discount rate as calculated by the respective decision trees may then be compared 820 and aggregated. In some further embodiments, the demand for each discount rate with respect to the other discount rates may then be compared in order to determine the ideal discount 825. The model determines the total revenue expected from each given discount rate to determine and output an ideal discount rate 830.

With reference to FIG. 9, some embodiments of the present invention generate a set of decision trees themselves based on a set of original data 910, rather than receiving the trees separately. In this embodiment, the model receives promotion information 900 receives a set of Desired Model Data 905 then the model generates a set of decision trees based on a set of original data 910. Each discount rate may be applied to the promotion information and the resulting demand for each discount rate is calculated for each decision tree 915. The demand for each particular discount rate may be compared between the various decision trees 920. Then, the demand for each discount rate may be compared to the other discount rates is considered 925. In some further embodiments, an indication of the ideal discount rate is presented to the user 930, as described in greater detail herein.

Combined Recursive Algorithm

Figure 10:
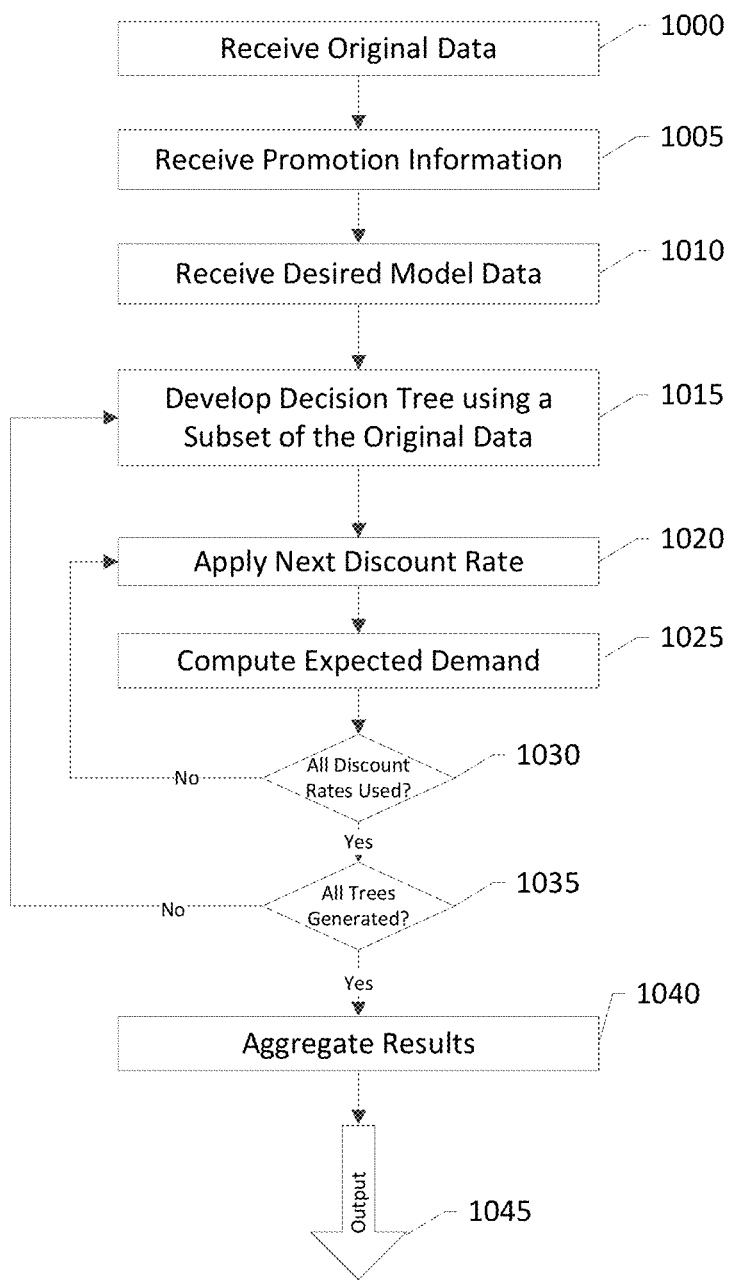
FIG. 10 is a flowchart illustrating a system that is configured to determine an ideal discount rate for a promotion, in accordance with an example embodiment of the present invention.

Some embodiments of the present invention, as shown in FIG. 10, use a recursive algorithm to generate the MOB trees at substantially the same time that the promotion information is applied to each tree for each discount rate. Some embodiments of the present invention receive a set of original data 1000, receive a set of promotion information 1005, and a desired model data 1010, which may include a set of predetermined discount rates and a number of MOB trees to generate. One of ordinary skill in the art will appreciate that the various inputs, 1000, 1005, 1010, may be received in any order from any one or more sources, including stored within the apparatus itself.

The model may then develop a decision tree using a subset of the original data as in the methods previously discussed 1015. The model may then iteratively apply each discount rate 1020 of the predetermined discount rates to the tree. As previously discussed, in some embodiments, the discount rates may be stored or predetermined by the system or received as an input from the user. In some embodiments, a user may be presented with an option to choose specific discount rates. Additionally or alternatively, if no discount rates are selected, the system may use a default set of discount rates. In some embodiments, the discount rates may be determined from the existing discount rates in the set of original data. For each discount rate that is applied, the model may compute the expected demand for the particular discount rate currently being analyzed 1025.

Once every discount rate has been applied 1030 to the promotion information for a given decision tree, the process may continue 1035 and generates a new MOB tree 1015. Based on the desired number of trees, which may be stored or predetermined by the system or received as an input from the user, the model may iteratively decrement the number of remaining trees until every tree has been generated 1035. In some embodiments, once all the trees have been generated 1035 and each discount rate applied to each tree 1030, the model may then aggregate the data 1040 and output 1045 an indication of the ideal discount rate.

Figure 11:
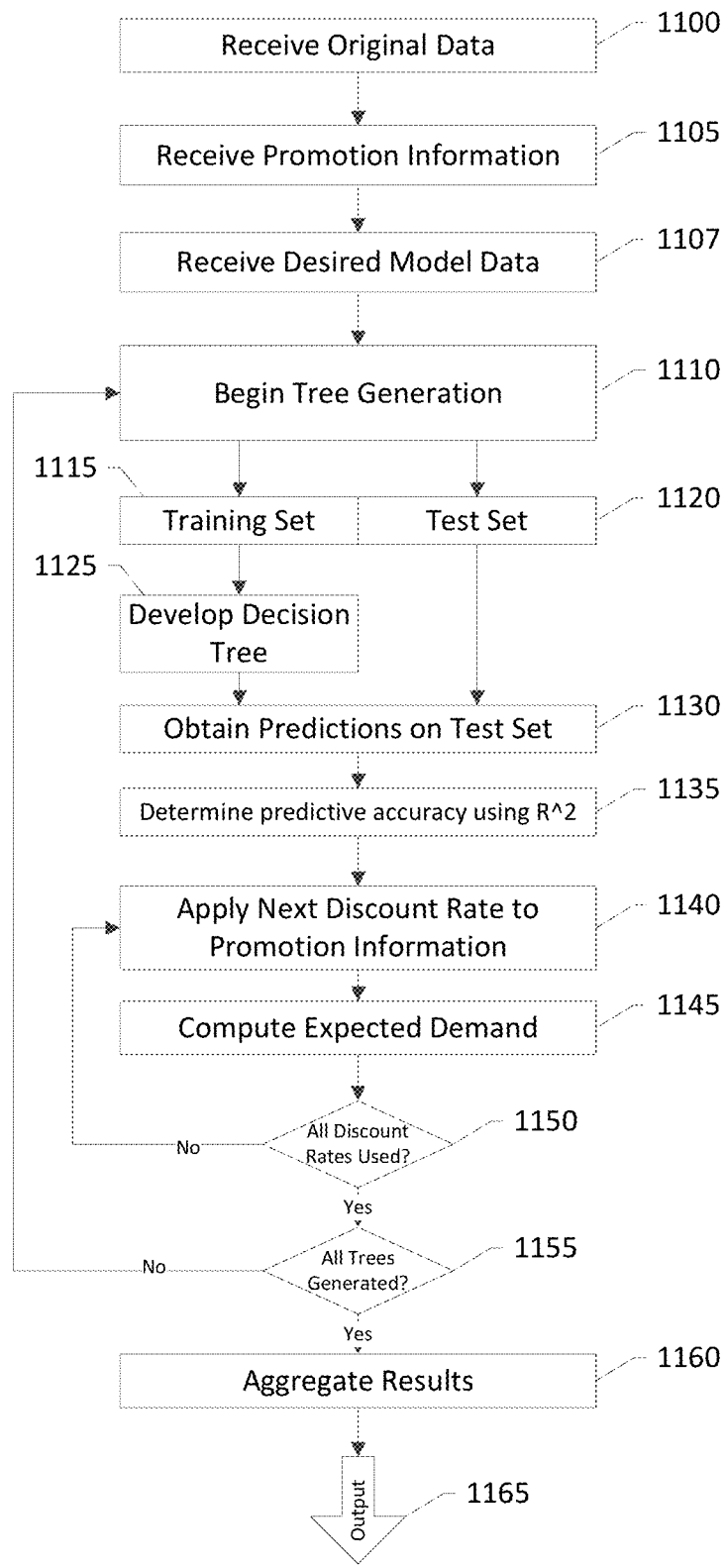
FIG. 11 is a flowchart illustrating a system that is configured to determine an ideal discount rate for a promotion, in accordance with an example embodiment of the present invention.

With reference to FIG. 11, another embodiment of the present invention is shown. In this embodiment, the algorithm receives the original data set 1100, receives promotion information 1105, and receives the desired model information 1107 that may include a predetermined number of discounts and a predetermined number of trees. The algorithm may then proceed to generate a MOB trees. In order to generate a particular decision tree, the model may split the original data into a training set 1115 and a test set 1120.

The model may then develop a decision tree based on the training set 1125. In some embodiments, the model then obtains predictions on the test set 1130 by applying the predictor variables from the test set to the decision tree 1130. The model may then determine the accuracy of the decision tree using the $R^2$ value of the data 1135 or other similar metric.

In some embodiments, there may optionally be a threshold for the model's accuracy before the tree model is applied to a set of data. In some embodiments a tree model may be discarded if its $R^2$ value is below a certain threshold. For example, some embodiments may exclude some percentage of tree models with the lowest model accuracy (e.g. the bottom 5%). The total number of predetermined trees may include tree models that are thrown out such that a predetermined number of accurate models may be generated, and discarded models are not counted. Alternatively, in some embodiments, the total number of trees may include the tree models that are discarded.

The model may then iteratively apply one or more discount rate 1140 from the set of predetermined discount rates. For each discount rate, the model may compute the expected demand for the promotion at the particular discount rate currently being analyzed 1145.

Once every discount rate has been applied 1150 to the promotion information for a given decision tree the process may continue 1155 and generates a new tree 1110. Based on the desired number of trees, the model may iteratively decrement the number of remaining trees until every tree has been generated 1155. Once all the trees have been generated 1155 and the discount rates for each discount rate applied to each tree 1150, the model may then aggregate the data 1160 and output 1165 an indication of the ideal discount rate.

Figure 12:
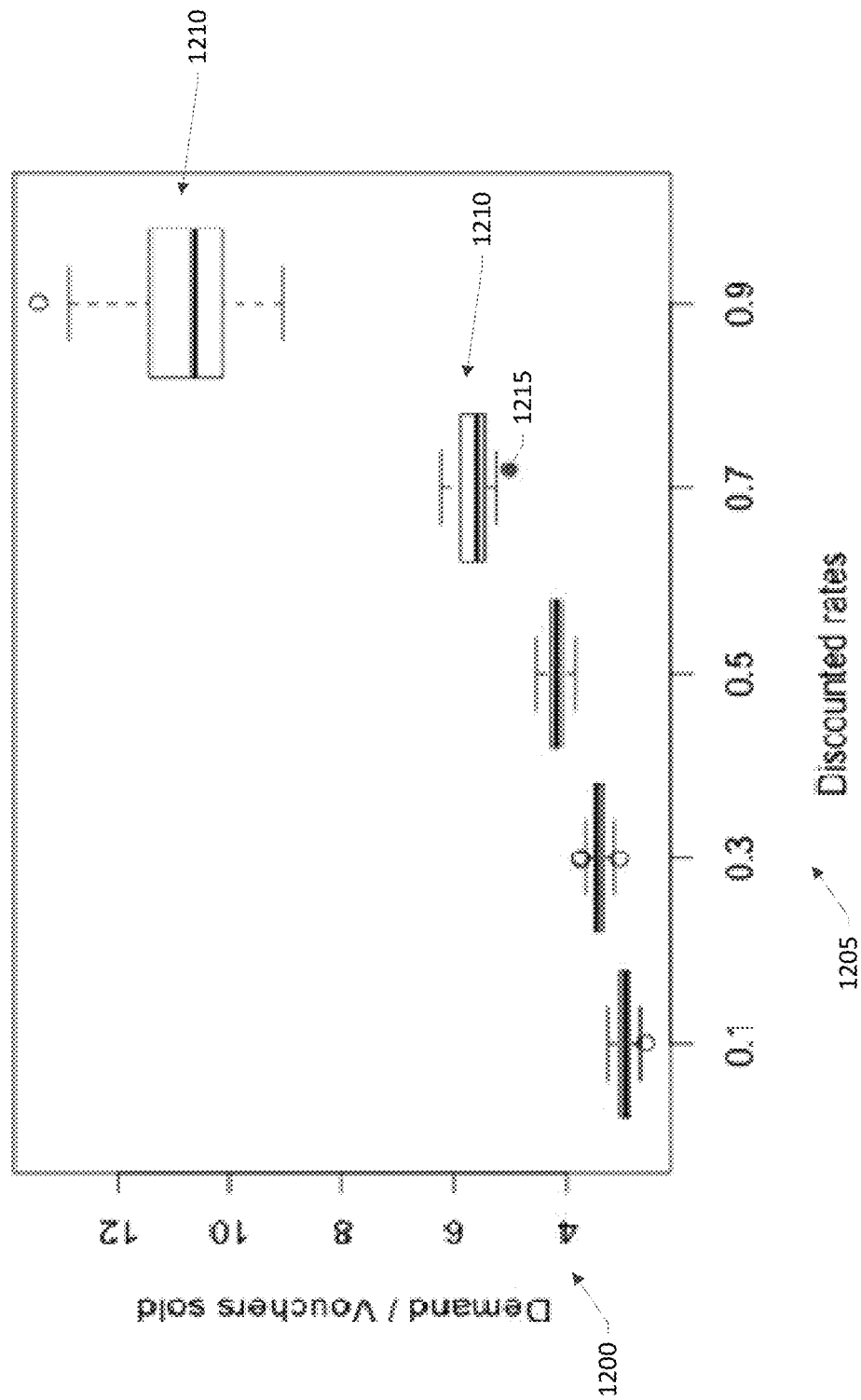
FIG. 12 is a plot of discount rate vs. demand, in accordance with an embodiment of the present invention.

FIG. 12 shows an embodiment of a possible output presented for one embodiment of the present invention. The graph shown in FIG. 12 may be an intermediate step in the output used to determine the ideal discount rate or it may be a final product for a user who wishes to see the price elasticity of demand curve for the entire promotion at every discount rate. In some embodiments, the original price of the promotion is multiplied by the discount rate and the demand, the total revenue for a given promotion at a given discount rate is generated. Some embodiments may display the total predicted revenue for each discount rate or the total predicted revenue for the calculated, ideal discount rate. In some embodiments, the predicted demands 1210 for each discount rate may be computed and a more simple display of an average demand or expected demand. In some embodiments, only an indication of an ideal discount rate may be displayed. One of ordinary skill in the art will appreciate that any output a user desires relating to the ideal accepted value, ideal discount rate, and price elasticity of demand may be presented.

In some further embodiments, actual data points of demand 1215 may be taken either as part of the evaluation process using the test set, or the actual data points 1215 may be acquired through real trials of the promotion.

The plot in FIG. 12 shows a comparison of demand 1200 to discount rate 1205. The demand predictions 1210 in FIG. 12 show a predicted demand for each discount rate of the product with the bars showing the confidence intervals 1210 for each discount rate. These predicted confidence intervals 1210 may show the predicted error in each discount rate. The confidence intervals 1210 may be calculated during the evaluation and aggregation of the various demands for each discount rate as a result of the differences between the predictions of the various tree models. The confidence interval 1210 represents the range in which a predetermined percentage of the predicted results will fall. For example, some embodiments may represent a 95% confidence interval, meaning 95% of the demand values are expected to fall within the depicted range. This embodiment illustrates the usefulness of multiple tree models to compute an accurate value of the demand for each discount rate because a large number of trees can generate a better fit and a more accurate average demand for each discount rate. In some embodiments, a large number of trees may be used, such as 400 tree models. In some embodiments, more tree models are always preferred in order to increase the accuracy of the overall model. In some further embodiments, the marginal benefit to accuracy of adding an additional tree model to the overall model may decrease after a certain number of models. In some embodiments, the total number of tree models may be limited by the available time or technical limitations of the computing device. One of ordinary skill in the art will appreciate that a higher or lower number of trees may be chosen based on a desired fit of the model and the technical limitations of the apparatus performing the calculations.

The style of the output may also depend on the user. For example, in some embodiments, the user is a promotion and marketing service. If the promotion and marketing service desires a full accepted value vs. demand curve, the system may output a full curve. If, however, the promotion and marketing service desires a simplified presentation of just the ideal discount rate, the system may provide a text or graphical output of the discount rate. In another embodiment, the provider may be the user. In this embodiment, the provider inputs its promotion information and receives an output indicating an ideal discount rate, an accepted value vs demand curve, or any other desired output. Additionally, some embodiments of the present invention may be built in tools in other systems, such as a spreadsheet, to calculate the ideal discount and price elasticity of demand information for the user.

Computing Device Architecture

Figure 13:
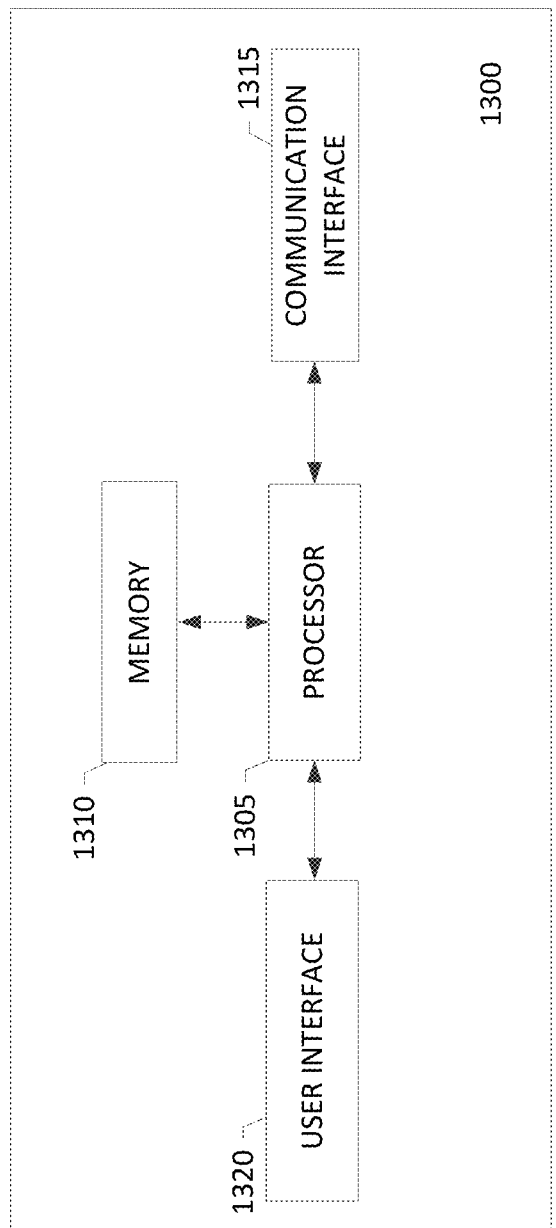
FIG. 13 is a block diagram of an apparatus that may be specifically configured in accordance with an example embodiment of the present invention.

In some embodiments of the present invention, an apparatus, such as a demand module 100, aggregator module 115, tree generator module 110, leaf generator module 250, evaluation module 305, 310, or combined evaluator module 315 may be embodied by a computing device. The computing device may include or be associated with an apparatus 1300 as shown in FIG. 13. In this regard, the apparatus may include or otherwise be in communication with a processor 1305, a memory device 1310, a communication interface 1315 and a user interface 1320. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 1305 (and/or co-processors or any other processing circuitry assisting or otherwise associated with the processor) may be in communication with the memory device 1310 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 1300 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 1300 may configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 1305 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 1305 may be configured to execute instructions stored in the memory device 1310 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In an example embodiment, the processor may also include user interface circuitry configured to control at least some functions of one or more elements of the user interface 1320.

Meanwhile, the communication interface 1315 may be any means such as a device or circuitry embodied in either hardware or a combination of hardware and software that is configured to receive and/or transmit data between apparatus 1300 and databases (not pictured). In this regard, the communication interface 1315 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with a display, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 1320 may be in communication with the processor 1305, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 1310 and/or the communication interface 1315, such as via a bus.

In one embodiment, a system to generate tree models may be provided herein. In some embodiments, a system that applies a promotion data and discount rates to one or more tree models may be provided. In other embodiments, a system may be provided that both generates tree models and applies promotion data to the models. Some embodiments of the system may be configured to increase (or maximize) gross revenue or determine another ideal discount rate by adjusting a discount rate or accepted value for a promotion for each tree while collecting the resulting data.

In one example embodiment, the system is configured to provide at least one of (1) more unit sales for a promotion; (2) higher bookings and gross revenue; (3) higher margins for popular promotions; and (4) more commerce, for example, on the promotion and marketing service platform, all of which may determine the ideal discount rate and/or ideal accepted value for the promotion and marketing service.

Regarding the inputs to the demand module, there are four main pieces. (1) Promotion Information: which may include a promotional value of the promotion and one or more predictor variables for the promotion; (2) Discount Rates: one or more possible discount rates to consider in determining the ideal discount rate, which may include an entire range of discounts (e.g. 0-50%) or a list of specific discount rates (e.g. 10%, 20%, 30%) (note, however, that promotional value and discount rate may be simplified and combined into one or more possible accepted values); (3) MOB Trees: trees may be generated by the same system as the demand module, or may be input from elsewhere; (4) Optional Information: any options for the user in generating and applying the models, such as random forest vs. standard bagging or sub-sampling vs. bootstrapping.

Regarding the inputs to the tree generation module, there are two main pieces. (1) Original Data: a set of data for previous promotions that may include information about each promotion as described above; and (2) Desired Number of Trees: either an algorithm for determining a number of trees to generate or a specific number of trees may be provided.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for generating a promotion to be offered by a promotion and marketing service via a promotion and marketing system, the method comprising:
   receiving, via a provider interface on a provider device of the promotion and marketing system, promotion information about the promotion, wherein the promotion information includes a plurality of promotion variables including at least a promotional value;
   receiving, at the provider device from the promotion and marketing service, a plurality of model-based decision trees;
   calculating, via a processor, for each of the plurality of model-based decision trees, a demand value for the promotion for each of at least one predetermined discount rate by applying the promotion variables with each predetermined discount rate to each decision tree, wherein each decision tree comprises a plurality of decision points connected by a plurality of branches and ending at a plurality of leaves, the decision points being conditional filters that indicate one of the plurality of possible branches based on a value of at least one predictor variable, and wherein each leaf defines a statistical model;

aggregating the demand values for each discount rate for each decision tree for the promotion variables to produce an aggregated price elasticity of demand; and presenting a discount recommendation to a provider via the provider interface based on the aggregated price elasticity of demand;

applying the discount recommendation to the promotional value to generate the promotion based on approval of the discount recommendation; and transmitting the promotion to a consumer device via the promotion and marketing system.

2. The method of claim 1, wherein the plurality of decision trees are generated from an original data set including a plurality of deal data, the deal data including a demand data, a price data, and data corresponding to a plurality of predictor variables;

wherein each decision tree is generated using a subset of the original data set, wherein each leaf is a linear model made by performing a linear regression of demand data compared to price data of a remaining subset of data corresponding to a terminal branch.

3. The method of claim 2, wherein applying the promotion variables with each predetermined discount rate to each tree comprises:

determining, via a plurality of decision points, a resultant leaf for the promotion variables at each discount rate; and calculating the demand value for the promotion for each predetermined discount rate with the linear model of the respective resultant leaf.

4. The method of claim 2, wherein the original data set is divided into a training set and a test set, wherein the training set is used to generate one of the plurality decision trees and the test set is used to evaluate an overall model of the one of the plurality of decision trees.

5. The method of claim 4, wherein the overall model is evaluated using $R^2$ metric for a predicted demand value of each deal data in the test set.

6. The method of claim 2, wherein the original data is received from previous promotions.

7. The method of claim 2, wherein the subset of the original data set is generated randomly for each decision tree.

8. The method of claim 7, wherein the subset of the original data set is generated using random sampling with replacement.

9. The method of claim 7, wherein the subset of the original data set is generated using random sampling without replacement.

10. The method of claim 2, wherein each decision point is generated by dividing a first remaining subset of the original data at the predictor variable having a highest parameter instability to form a plurality of second remaining subsets.

11. The method of claim 10, wherein each decision tree is generated by recursively generating decision points from each remaining subset until a stopping point is reached for each branch.

12. The method of claim 11, wherein the stopping point is reached when the second remaining subsets have less than or equal to a minimum number of deal data.

13. The method of claim 12, wherein each decision point is generated by selecting a random subset of a first remaining subset and dividing the first remaining subset of the original data at the predictor variable from the random subset having a highest parameter instability to form a plurality of second remaining subsets.

14. The method of claim 13, wherein each decision tree is generated by recursively generating decision points from each remaining subset until a stopping point is reached for each branch.

15. The method of claim 14, wherein the stopping point is reached when the second remaining subsets have less than or equal to a minimum number of deal data.

16. The method of claim 1, wherein the discount recommendation is presented as a graphical representation of the demand for the promotion at each of the at least one predetermined discount rate.

17. The method of claim 1, wherein the discount recommendation is presented as an ideal discount rate.

18. The method of claim 1, wherein the at least one predetermined discount rate comprises at least one of 10%, 30%, 50%, and 70% discount rates.

19. A promotion and marketing system comprising at least a processor, and a memory associated with the processor having computer coded instructions therein, with the computer instructions configured to, when executed by the processor, cause the system to:

receive, via a provider interface on a provider device of the promotion and marketing system, promotion information about a promotion, wherein the promotion information includes a plurality of promotion variables including at least a promotional value;

receive, at the provider device from the promotion and marketing service, a plurality of model-based decision trees;

calculate for each of the plurality of model-based decision trees, a demand value for the promotion for each of at least one predetermined discount rate by applying the promotion variables with each predetermined discount rate to each decision tree, wherein each decision tree comprises a plurality of decision points connected by a plurality of branches and ending at a plurality of leaves, the decision points being conditional filters that indicate one of the plurality of possible branches based on a value of at least one predictor variable, and wherein each leaf defines a statistical model;

aggregate the demand values for each discount rate for each decision tree for the promotion variables to produce an aggregated price elasticity of demand;

present a discount recommendation to a provider via the provider interface based on the aggregated price elasticity of demand;

apply the discount recommendation to the promotional value to generate the promotion based on approval of the discount recommendation; and transmit the promotion to a consumer device with the promotion and marketing system.

20. The system of claim 19, wherein the plurality of decision trees are generated from an original data set including a plurality of deal data, the deal data including a demand data, a price data, and data corresponding to a plurality of predictor variables;

wherein each decision tree is generated using a subset of the original data set, wherein each leaf is a linear model made by performing a linear regression of demand data compared to price data of a remaining subset of data corresponding to a terminal branch.

21. The system of claim 20, wherein applying the promotion variables with each predetermined discount rate to each tree comprises:
   determining, via a plurality of decision points, a resultant leaf for the promotion variables at each discount rate; and
   calculating the demand value for the promotion for each predetermined discount rate with the linear model of the respective resultant leaf.

22. The system of claim 20, wherein the original data set is divided into a training set and a test set, wherein the training set is used to generate one of the plurality decision trees and the test set is used to evaluate an overall model of the one of the plurality of decision trees.

23. The system of claim 22, wherein the overall model is evaluated using $R^2$ metric for a predicted demand value of each deal data in the test set.

24. The system of claim 20, wherein the original data is received from previous promotions.

25. The system of claim 20, wherein the subset of the original data set is generated randomly for each decision tree.

26. The system of claim 25, wherein the subset of the original data set is generated using random sampling with replacement.

27. The system of claim 25, wherein the subset of the original data set is generated using random sampling without replacement.

28. The system of claim 20, wherein each decision point is generated by dividing a first remaining subset of the original data at the predictor variable having a highest parameter instability to form a plurality of second remaining subsets.

29. The system of claim 28, wherein each decision tree is generated by recursively generating decision points from each remaining subset until a stopping point is reached for each branch.

30. The system of claim 29, wherein the stopping point is reached when the second remaining subsets have less than or equal to a minimum number of deal data.

31. The system of claim 30, wherein each decision point is generated by selecting a random subset of a first remaining subset and dividing the first remaining subset of the original data at the predictor variable from the random subset having a highest parameter instability to form a plurality of second remaining subsets.

32. The system of claim 31, wherein each decision tree is generated by recursively generating decision points from each remaining subset until a stopping point is reached for each branch.

33. The system of claim 32, wherein the stopping point is reached when the second remaining subsets have less than or equal to a minimum number of deal data.

34. The system of claim 19, wherein the discount recommendation is presented as a graphical representation of the demand for the promotion at each of the at least one predetermined discount rate.

35. The system of claim 19, wherein the discount recommendation is presented as an ideal discount rate.

36. The system of claim 19, wherein the at least one predetermined discount rate comprises at least one of 10%, 30%, 50%, and 70% discount rates.

* * * * *